Dec. 21, 1948.   P. J. WALSH   2,456,802
OSCILLATOR SYSTEM
Filed July 22, 1946
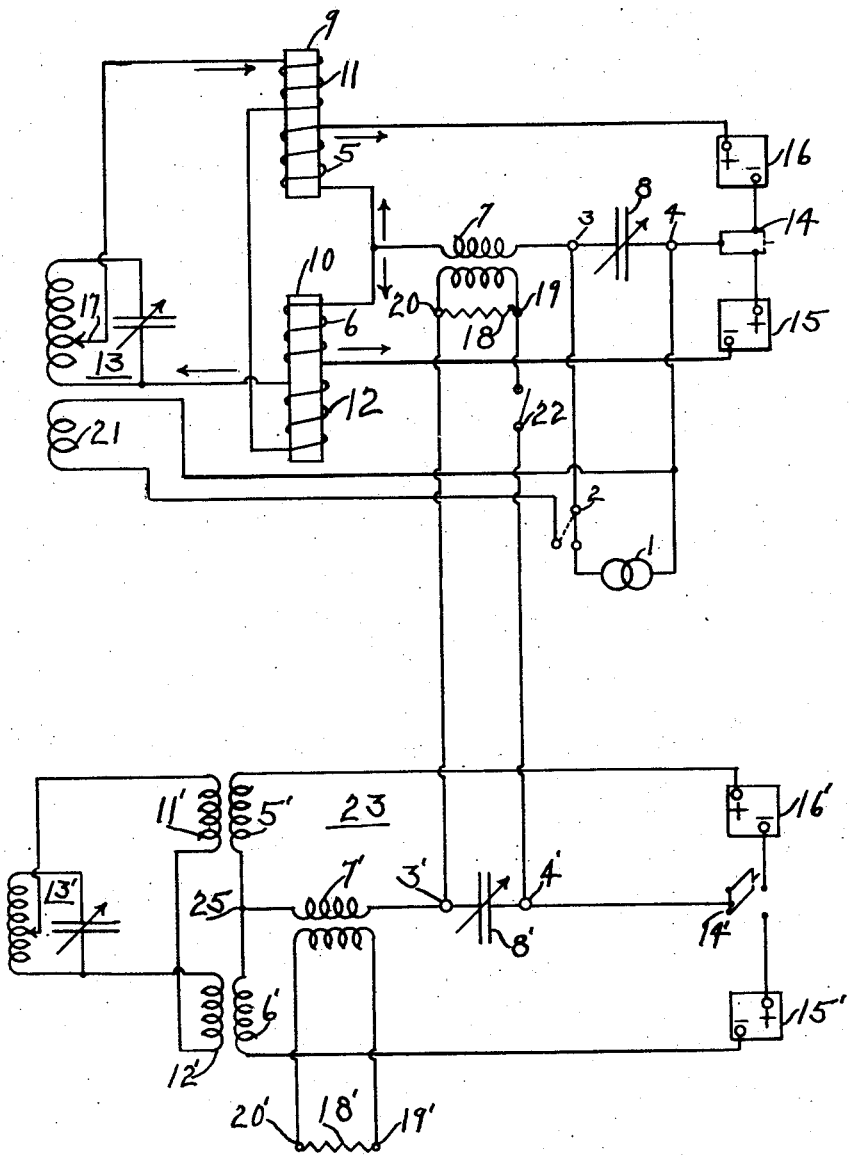
INVENTOR.
Philip J. Walsh.

Patented Dec. 21, 1948

2,456,802

UNITED STATES PATENT OFFICE 2,456,802

OSCILLATOR SYSTEM

Philip J. Walsh, San Francisco, Calif.

Application July 22, 1946, Serial No. 685,335

5 Claims. (Cl. 250—36)

This invention relates to a system for converting direct current into alternating current.

In my U. S. Patent 2,445,897, for Alternating current system, filed April 29, 1946, I describe a method for the conversion of direct current energy into alternating current energy in a system requiring no electronic emission devices or moving parts.

It is an object of this invention to improve the system described in my prior application.

It is another object of this invention to provide an efficient high frequency oscillation generator and power multiplier.

My invention possesses many other advantages and has other objects which may be made more easily apparent from a consideration of one embodiment of my invention. For this purpose, I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing, the single figure is a system diagram depicting one form of my invention.

In the drawing I show a source of alternating current potential 1 connected through the two position switch 2 to the terminals 3 and 4, across which is connected the parallel resonant circuit comprising the windings 5, 6, 7 and the variable condenser 8. The windings 5 and 6 wound on the tubes 9 and 10 of insulating material are coupled to the windings 11 and 12 respectively to form two separate transformers. The windings 11 and 12 being connected together through the parallel resonant circuit 13 which acts substantially as a pure resistance at its resonant frequency.

The batteries 15 and 16 are connected in series across the coils 5 and 6 and would, in the absence of other factors, send direct current through these coils, and since the coils are equal and the batteries apply equal electromotive forces to the system, there would be no direct current difference of potential across the terminals 3 and 4. The switch 14 is arranged so that when it is closed, both direct and alternating currents are applied to the system simultaneously in order to prevent a large flow of direct current through the coils.

In the operation of the system the switch 2 is closed first in the full line position, after which the switch 14 is closed. When the alternating current potential from the source 1 makes the terminal 3 positive and the terminal 4 negative, current flows in the direction of the full line arrows through the coils 7, 5 and 6 and the batteries 16 and 15. The value of the current flowing from terminal 3 through the coil 6 and battery 15 to terminal 4 is very much greater than the value of the current flowing from terminal 3 through the coil 5 and battery 16 to terminal 4, because the electromotive force of battery 15 is in series assisting relation with the electromotive force of the source 1 while the electromotive force of battery 16 is in series opposed relation with the electromotive force of source 1. The value of the reverse current flowing through the battery 16 is a function of the applied alternating current potential of source 1 and of the impedance of circuit 13.

The current flowing in the coils 11 and 12 at this instant, flows in the direction of the arrows with the coil 12 acting as a source of current and the coil 11 acting as the primary of a series transformer which induces an electromotive force in the coil 5 of such a direction as to assist the electromotive force of the source 1 and causes a small reverse current to flow in the direction of the arrows through the battery 16. The coil 11 acts as a load across the coil 12 thus causing more current from battery 15 to flow through coil 6 and reverse current to flow through battery 16. Adjustment of the tap 17 determines the amount of current flow through the coil 11—the circuit 13 acting like a series resistor.

If the peak or maximum electromotive force of the source 1 is made equal to that of one of the batteries, such as 16, and the tap 17 is set to its highest impedance point (maximum resistance) there would be no reverse current flow through the battery 16 and this part of the system would operate as described in my prior patent referred to on page 1.

With some reverse current flowing through the battery 16 the condenser 8 cooperates with the coils 5, 6 and 7 to form a parallel resonant circuit across the terminals 3 and 4. It is to be noted that this parallel resonant circuit has a pendulum or flywheel effect, and that the value of the current surging between the condenser 8 and the coils 5, 6 and 7 is very much greater than the value of the current flowing into it from the terminals 3 and 4.

During the other half of the cycle of applied alternating current from the source 1 the actions are reversed and the currents flow in a direction opposite to that indicated by the arrows. That is, terminal 4 is positive and terminal 3 negative so that the electromotive force of source 1 is in series assisting relation with the electromotive force of battery 16 and in series opposed relation with the electromotive force of battery 15. The large current now flows from terminal 4 through battery 16 and coils 5 and 7 to terminal 3. The coil 11 now acts as a source of induced current and sends current through the circuit 13 and coil 12 in a direction opposite to that indicated by the arrows. The electromotive force induced in the coil 6 by this current flowing through the coil 12 assists the electromotive force of the source 1 to send a small reverse current through the battery 15 in a direction opposite to that indicated by the arrows. That is, the coil 12 is now acting as the primary of a series transformer and the electromotive force induced in the coil 6 is a function of the valve of the current flowing in the coil 12. Now the coil 12 acts as a load across the coil 11 thus causing more current from the battery 16 to flow through coil 5 and reverse current to flow through battery 15.

A load such as 18, which could be an antenna, or an arrangement for high frequency heating, etc., is connected across the terminals 19 and 20. The energy dissipated in the load 18 is supplied by the combined action of the batteries and the source 1 and is greater than the alternating current energy fed in at the terminals 3 and 4 by the source 1.

When the switch 2 is thrown over to the dotted line position, the source 1 is disconnected and the coil 21 is connected to the terminals 3 and 4. This switch is arranged for fast snap action and has a wide arm so as to span both contacts and thus connect the coil 21 before disconnecting the source 1. The alternating current potential induced in the coil 21 by the parallel resonant tank circuit 13 is now applied to the terminals 3 and 4 and operates to trigger off energy from the batteries 15 and 16 so that the system continues to produce alternating current energy in the load 18 with the source 1 disconnected.

This system differs from that shown in my prior patent referred to on page 1, in that the circuit including the coils 11 and 12 is employed to supply feed back energy to maintain the system in a state of continuous oscillation, the load currents being taken from another transformer including the coil 7, thus making it possible to operate more efficiently.

The unit 23 is a power multiplier stage in which the output from the terminals 19 and 20 can be combined with energy from the batteries 15' and 16' to produce a larger power output in a load such as 18'. Since the operation of this stage is similar to that of the first stage the numerals designating corresponding parts have been primed.

In the operation of this stage, the switch 22 is closed first, after which the switch 14' is closed. It is seen that when the terminal 3' is positive and the terminal 4' negative, current flows from terminal 3' through the coil 7' to the point 25 where the current divides, most of it flows through coil 6' and battery 15'; the small part flows through coil 5' and as reverse current through battery 16' to terminal 4'.

Since the voltage of battery 15' is in series assisting relation with the voltage from terminals 19 and 20, direct current energy from the battery 15' combines in coil 7' with alternating current energy from terminals 19 and 20 to produce more alternating current energy in the load 18' than is fed in from the terminals 19 and 20. During the other half of the cycle when the terminal 4' is positive and the terminal 3' negative, most of the current flows from terminal 4' through the battery 16', coil 5', coil 7' to terminal 3'. Since the voltage of battery 16' is now in series assisting relation with the voltage from terminals 19 and 20, direct current energy from the battery 16' combines in coil 7' with alternating current energy from terminals 19 and 20 to produce a greater amount of alternating current energy in the load 18' than is fed in from the terminals 19 and 20. The currents flowing in the coils 11' and 12' serve to induce voltages in the coils 5' and 6' at the proper times to produce a small reverse current through one of the batteries as was described in connection with the first stage.

Any number of stages such as 23 can be connected as shown to produce a large power output. Sources of power other than batteries can be employed, such as dynamos etc. The load 18' could be an antenna and the source 1 could be the modulated output of a radio transmitter. Then with the switch 2 in the full line position and the switches 22 and 14' closed, both stages would operate as power multipliers to produce a large power output in 18'. Or the first stage could be operated as an oscillator and the second stage as a power multiplier to form a radio transmitter. Since no electronic emission devices are employed, the system operates at high efficiency directly from a very low voltage source of direct current.

I claim:

1. In combination, a tuned circuit having two branches and a common branch, a source of direct current in each of said two branches, and means including a source of alternating current potential coupled to said common branch to alternately oppose the flow of current from one of said direct current sources while increasing the flow of current through the other direct current source during each cycle, and an output circuit coupled to said common branch.

2. The system as claimed in claim 1, with the addition of means coupling said two branches to increase the flow of current through one of said direct current sources and reverse the direction of current flow through the other direct current source during each cycle.

3. The system as claimed in claim 1, with the addition of means coupled to said two branches to feed back energy to said common branch to sustain continuous oscillations upon removal of said original source of alternating current potential.

4. In a system of the character described, a multi-stage power multiplier comprising a plurality of similar stages, each including a circuit having two branches and a common branch, a source of direct current in each of said two branches, and means including a source of alternating current potential coupled to said common branch to alternately oppose the flow of current from one of said direct current sources while increasing the flow of current through the other direct current source during each cycle, an output circuit coupled to said common branch, and means for feeding the output power of one stage into the input of the next stage.

5. The system as claimed in claim 4, with the addition of feed-back means in the first stage to sustain continuous oscillations therein upon removal of the original source of alternating current potential coupled to the input of this stage.

PHILIP J. WALSH.

No references cited.